Dec. 20, 1955   D. N. COVERT ET AL   2,727,764
BEARING SEAL
Filed May 17, 1951

Inventors
DON N. COVERT
RAY L. DENNEY

Attorney

United States Patent Office 2,727,764
Patented Dec. 20, 1955

2,727,764

BEARING SEAL

Don N. Covert, Pleasant Valley, and Ray L. Denney, Poughkeepsie, N. Y., assignors to The Federal Bearings Co., Inc., Poughkeepsie, N. Y., a corporation of New York Application May 17, 1951, Serial No. 226,901

1 Claim. (Cl. 286—5)

This invention relates to bearings and more particularly to sealing means thereof to seal in lubricant and keep out foreign matter. More specifically, the invention is concerned with improvements in the sealing means of bearings having relatively rotatable inner and outer race members, such sealing means including a flat washer for sealing the space between the inner and outer race members.

The general object of the invention is to provide novel sealing means which will produce and maintain a more perfect seal than heretofore obtainable and at the same time will have minimum frictional resistance to rotation of the rotary part of the bearing.

More specifically, an object of the invention is to provide novel sealing means involving a sealing washer which is flexed into engagement with an annular seat on one of the bearing members so as to be self-adjusting on said seat into intimate sealing engagement therewith, even after prolonged use of the bearing. In line with this object, it is intended to provide a sealing washer having a hard texture and substantial body rigidity, yet capable of transverse flexure out of its normal plane but, when so flexed, strongly tending to return to its untensioned state.

A feature of the invention is that the sealing washer is flexed in sealing position into a constricted space between two bearing members and is anchored or rigidly held along one peripheral circular edge to one of the rings while the other edge of the washer is free and in riding engagement with an abutting surface of the other member. The washer tends to relieve its flexure by exerting contact at its free inner peripheral edge against the abutting surface of the inner race member. The inherent body rigidity of the sealing washer and its consequent strong tendency to relax to untensioned condition causes the washer to maintain intimate contact with the abutting surface of the inner race. The rigidity of the washer will effectively counteract the pressure of the lubricant in the bearing. Further, according to the invention, the tension of the sealing washer will be directed axially inward of the bearing further to resist the pressure of the lubricant tending to displace the washer from sealing position.

A sealing washer of spring metal, for example, would have the indicated characteristics. However, it is a further object to make the sealing washers at low cost from plastic material. By way of example, one such material which has been found satisfactory is the du Pont Company's nylon FM 10001. A washer of such material will have the indicated characteristics as well as other advantages. One advantage is the chemical inertness of nylon to the lubricant and its additives, so that a washer of this material will not be deteriorated by the lubricant composition nor contaminate the lubricant composition. Another advantage is that the washer will have great resistance to abrasion and not be subject to tearing by the rotating part of the bearing, unlike washers made of rubber or the like which have a yieldable texture and a higher coefficient of friction. In fact, a seal made of nylon or equivalent material will be smoothed at its points of engagement with the rotating member of the bearing, with resulting lessening of frictional drag of the washer on the rotating member.

Another object of the invention is to provide for a minimum surface of the sealing washer to ride on a seat on the inner member of the bearing; specifically to arrange and position the sealing washer for circular edge running engagement with its seat on the inner member. Such edge will be the circular line defined by the intersection of a face of the sealing washer with one of its bounding circles. The sealing engagement may be considered a point engagement at each radial terminus of the circular edge of the sealing washer riding on the inner member of the bearing. By such riding engagement of the sealing washer with the inner bearing member, the frictional drag of the sealing washer on the inner member is reduced to the minimum.

According to the invention, the radial dimension between the inner and outer periphery of the annular sealing washer is greater than the distance between its annular seats in the concentrically disposed inner and outer members of the bearing, whereby the forcible insertion of the sealing washer into the constricted space between its seats will result in flexure of the washer axially inwardly substantially throughout its cross-sectional area. Further, according to the invention, the washer is effectively and rigidly set into the seat in the outer bearing member which seat is offset axially from the operative points of engagement of the sealing washer with the seat on the inner member. In effect, each radial element of the sealing washer will partake of the nature of a radially extending spring held at its point of engagement with the outer race member and free at the other end to abut a point on the seat of the inner race member, these two points being so offset and spaced apart as to flex the spring in a direction to exert pressure at its free end against the abutting point of the seat on the inner member. It is to be particularly noted that the sealing washer will be flexed solely by its constriction between its annular seats in the inner and outer bearing members and without the aid of an additional element to impart such flexure.

According to the invention, the inner member is formed with an inclined arcuate groove and the sealing washer flexed in a direction tending to relieve its flexure by riding up or inwardly on the inclined groove, whereby the washer will maintain intimate contact with the groove in the inner member even after prolonged use of the bearing and wear on the washer.

It is to be noted that according to the invention, it is required that the portion of the sealing washer engaged in and adjacent to the seat in the outer member be relatively more rigidly held against transverse movement than the relatively free portion of the washer flexed against the inclined groove in the inner ring. This requirement is met by use of a continuous or split metal backing or retaining ring inserted into the seat in the outer race member substantially to fix the sealing washer into the seat. Alternatively, this requirement may be met by making the washer more rigid, as by increased thickness, along the portion which is to be set into the seal seat.

Other objects of the invention will become clear from the following portions of the specifications and from the drawings, in which.

Figure 1:
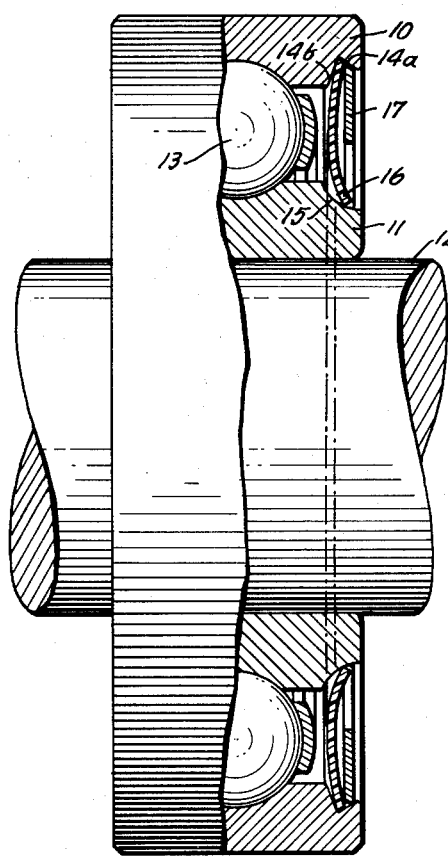
Fig. 1 is a section through an anti-friction bearing provided with the novel sealing washer held in the outer race member by a retaining ring and showing in dot and dash lines the position to which the sealing washer tends to relax.
Figure 2:
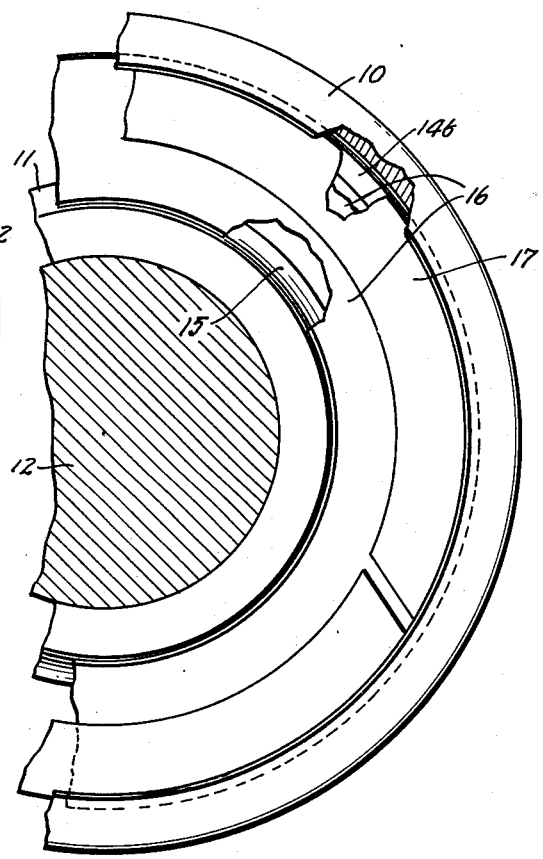
Fig. 2 is a side view of the bearing, with parts broken away to show the interior.

In the illustrative bearing shown in Figs. 1 and 2, the outer race member 10 is stationary, the inner race member 11 is rotatable with a shaft 12, and ball elements 13 are seated between the race members. The outer race member is counterbored adjacent each side face to provide two annular V-shaped grooves in its inner periphery, only one being shown, each defining walls 14a and 14b forming an acute angle therebetween. The inner race member is provided at each end with an inclined annular groove 15 of arcuate cross-section extending from each end face thereof to its outer periphery.

The sealing washers, one of which is designated 16, may conveniently be stamped out of a flat sheet of plastic material such as nylon or its equivalent, or may be made by any other process, as by molding from a polyamide resin or the equivalent. The sealing washer 16 is semi-rigid and capable of withstanding considerable pressure, against its inside face, by the sealed-in lubricant. At the same time the washer will be sufficiently flexible to allow it to flex transversely upon insertion in the bearing. The sealing washer which is flat prior to insertion in the bearing, has a greater radial dimension between its inner and outer peripheries than the distance between the apex of the V-shaped annular groove, defined by the wall surfaces 14a—14b and points on inclined groove 15 facing and radially aligned with the apex of the V-shaped annular groove. Considering, for instance, the right hand annular seats, as viewed in Fig. 1, the distance between the V-groove defining surfaces 14a—14b and a point on the arcuate groove 15 axially offset to the right of the surfaces 14a—14b is less than the span between the inner and outer peripheries of the sealing washer 16. Concomitantly, the inner diameter of the sealing washer is just large enough to pass over the smallest diameter of inclined groove 15 but smaller than the intermediate diameter thereof, located axially to the right of the V-shaped groove. Thus, a constricted space is provided between the respective annular seats for the sealing washer and the seats so relatively offset that as the sealing washer is forced into the apex of the V-groove, it will flex axially in an inward direction to exert pressure against an intermediate portion of the inclined groove 15. In other words, the sealing washer will be flexed by constriction in the annular V-groove in such manner as to ride upwardly on the inclined arcuate groove and thus maintain intimate peripheral edge or line contact with the inner race member of the bearing.

In the form of invention shown in Figs. 1 and 2, the outer rim or peripheral edge portion of the sealing washer 16 is forced into the apex of the V-groove defined by the surfaces 14a—14b and backed up with a metallic retention ring 17 which is sprung or pressed into the V-groove. It is to be noted that the retention ring 17 is out of contact with the major portion of the sealing washer and does not engage it to impart or maintain its flexure, but merely to hold the outer peripheral edge portion thereof firmly against the inclined shoulder 14b of the annular V-groove in the outer race member.

It is to be noted that the engagement between the free inner peripheral edge of sealing washer 16 and the inclined arcuate groove 15 is along a circular line at the intersection of the rear face of the sealing washer and its inner periphery. That is, there is point engagement between the sealing washer and the inner race member at each inner radial terminus of the washer. Thus, even though the sealing washer is flexed constantly into tight sealing engagement with the inner race member, there is a minimum of surface contact between the two with a consequent minimum frictional effect between them.

Figure 3:
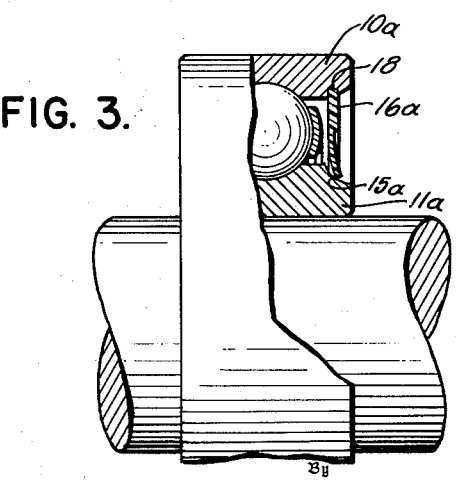
Fig. 3 is a view similar to Fig. 1 but showing a modified form of sealing washer with which no retaining ring is employed.

The retaining ring 17 may be dispensed with, as indicated in Fig. 3. In the form of sealing washer shown in Fig. 3, the outer portion of the washer, here designated 16a, is thicker and, hence, more rigid than the inner portion of the washer. The more rigid outer portion of the washer may be sprung into tight sealing engagement inside an annular seat 18 in the outer race member 10a while the inner, less rigid portion of the washer is flexed against a portion of the inclined groove 15a in the inner race member 11a. It is to be noted that the sealing means shown in Fig. 3 is essentially the same as the sealing means shown in Fig. 1, the sole material difference being that the sealing means of Fig. 1 utilizes a retaining ring 17 to hold the modified sealing washer firmly against the shoulder 14b of the V-groove, while the sealing means of Fig. 3 provides for the desired rigidity by increased thickness of the portion engaged in and adjacent the outer race member 10a.

Sealing washers 16a may be made at low cost by a molding process from one of a family of polyamide resins commonly known as nylon or the equivalent.

While the invention has been shown as embodied in a device in which the inner element is the rotating element, it is to be understood that it is the relative rotation between the inner and outer elements which must be considered and it is contemplated that the outer element may be the rotating one.

The invention has been shown and described in connection with an anti-friction bearing, but it is to be understood that the invention may be applied to other forms of bearings and that variations and modifications in the form and details of the sealing means shown and described may be made without departing from the spirit of the invention. It is intended, therefore, to be limited only as indicated by the scope of the following claim.

We claim:

A lubricant seal for an anti-friction bearing comprising inner and outer annular race members wherein the inner race member is provided with a reduced outer diameter portion and the outer race member with an enlarged inner diameter portion adjacent an end face of the inner and outer race members, respectively, to form an enlarged annular space therebetween; an annular seal comprising a flat washer formed of nylon having an inner diameter just large enough to receive the reduced outer diameter portion of said inner race member part way therein, and an outer diameter larger than the enlarged inner diameter portion of said outer race member, said flat washer being pressed into the enlarged annular space between said race members whereby said washer is flexed axially inwardly substantially throughout its cross-sectional area between the point where its inner peripheral edge engages the reduced outer diameter portion of said inner race member and the point where its outer peripheral edge engages the enlarged inner diameter portion of said outer race member, the inner peripheral edge of said washer being in line contact with the reduced outer diameter portion of said inner race member, and a flat retention ring secured in the enlarged inner diameter portion of the outer race member, said retention ring having an outer peripheral edge which engages said washer solely in the region of the outer peripheral edge of the washer.

References Cited in the file of this patent

UNITED STATES PATENTS

| | | |
|---|---|---|
| 2,252,554 | Carothers | Aug. 12, 1941 |
| 2,281,010 | Reynolds et al. | Apr. 28, 1942 |
| 2,310,607 | Batesole | Feb. 9, 1943 |
| 2,336,913 | Albrecht | Dec. 14, 1943 |
| 2,621,091 | Hickling | Dec. 9, 1952 |

FOREIGN PATENTS

| | | |
|---|---|---|
| 508,640 | Great Britain | of 1939 |
| 622,418 | Great Britain | of 1949 |
| 978,288 | France | Nov. 22, 1950 |

OTHER REFERENCES

"Molded and Machined Nylon," Product Engineering, December 1946.